United States Patent
Housel (10) Patent No.: US 6,967,747 B2
(45) Date of Patent: Nov. 22, 2005

(54) METHOD AND SYSTEM FOR MATCHING MARKING DEVICE OUTPUTS

(75) Inventor: Edward M. Housel, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 895 days.

(21) Appl. No.: 09/791,935

(22) Filed: Feb. 22, 2001

(65) Prior Publication Data

US 2003/0164960 A1 Sep. 4, 2003

(51) Int. Cl.$^7$ ................................................. H04N 1/00
(52) U.S. Cl. ........................ 358/1.9; 358/406; 358/1.4; 358/1.6
(58) Field of Search ................. 358/406, 504, 358/1.1, 1.4, 1.6, 1.9

(56) References Cited

U.S. PATENT DOCUMENTS

| | | | |
|---|---|---|---|
| 5,170,257 A | 12/1992 | Burns | 358/298 |
| 5,245,443 A | 9/1993 | Burns | 358/298 |
| 5,260,806 A | 11/1993 | Samworth | |
| 5,317,425 A * | 5/1994 | Spence et al. | 358/504 |
| 5,345,315 A * | 9/1994 | Shalit | 358/406 |
| 5,347,369 A | 9/1994 | Harrington | 358/401 |
| 5,457,541 A | 10/1995 | Burns | 358/298 |
| 5,537,516 A | 7/1996 | Accad et al. | |
| 5,568,572 A | 10/1996 | Shu | 382/260 |
| 5,936,741 A | 8/1999 | Burns | 358/298 |
| 6,035,103 A * | 3/2000 | Zuber | 358/1.9 |

FOREIGN PATENT DOCUMENTS

| | | |
|---|---|---|
| EP | 0 454 085 A | 10/1991 |
| EP | 0 658 043 A | 6/1995 |
| WO | WO 93 20648 A | 10/1993 |

OTHER PUBLICATIONS

Heidelberg Manual, Delta Technology OutputManager • Utility, Edition Sep. 1999, Order No. 05418453 (see Chapter 4).

European Search Report No. 02003936.8, Dated May 24, 2002 with copies of cited referenced stated above.

* cited by examiner

Primary Examiner—Thomas D. Lee
(74) Attorney, Agent, or Firm—Kevin L. Leffel; Richard A. Romanchik (57) ABSTRACT

A method is provided for substantially matching a first output produced by a first marking device with a second output produced by a second marking device. A first set of sample tone levels is produced using the first marking device. A second set of sample tone levels is then produced using the second marking device. The first and second sets of sample tone levels are then compared and one or more calibration set points are determined. A custom tone transfer function associated with the first marking device is generated in accordance with the calibration set points. The first output is then produced from the first marking device using the custom tone transfer function.

9 Claims, 6 Drawing Sheets

METHOD AND SYSTEM FOR MATCHING MARKING DEVICE OUTPUTS

Incorporated by reference is a computer program listing attached as Appendix A. Appendix A is submitted concurrently herewith on a compact disc labeled by at least the title and inventors associated with this application. On the compact disc, Appendix A is contained within the file named "AppendixA.txt", and is 18.3 kilobytes in size.

BACKGROUND OF THE INVENTION

This invention relates to electrophotographic marking devices and systems. In particular, the present invention relates to methods and apparatus for matching the output of one marking device with that of another marking device.

A typical marking device, such as a printer, is used to produce typeset-quality output from a client. The client, or computer front end, generally includes an application program that is used to create or find an image to be output. The application program sends the image to the device driver, which serves as an interface between the client and the marking device. The device driver then encodes the image in a page description language ("PDL"), and sends the encoded image to the marking device.

Many conventional marking devices include a raster image processor and a marking engine. The raster image processor receives the PDL-encoded image from the client marking device driver and converts the image into a raster, or a grid of lines. Each line includes a series of pixels that may be turned on or off as necessary to represent the contents of the image. The raster image processor sends this rasterized stream of pixels to the marking engine for output to a receiver.

Conventional marking processes are limited in that they cannot produce a continuous spectrum of tone levels within an image. Instead, modulated patterns are used to simulate different tone levels. One common form of modulation is the use of halftones. For instance, many typical black and white printers use halftones to produce a variety of gray levels, such as 30% white or 60% white. The use of halftones involves dividing the rasterized image into halftone cells, each of which contains a fixed number of pixels. A continuous tone spectrum thus may be approximated by turning on a certain percentage of the pixels in each halftone cell. Theoretically, a 50% gray level may be achieved by turning on 50% of the pixels in a halftone cell on a black and white printer. In practice, the actual gray levels produced by different marking devices vary somewhat from this ideal. Three factors that typically affect how a pixel is produced by a given marking device include screen angle, spot function, and frequency (i.e. lines per inch). Variation in these factors often causes some marking devices to produce output that is too dark while other marking devices produce output that is too light. Accordingly, a 50% halftone produced by a particular marking engine may result in a gray level that is slightly more or less than 50% white.

Slight variation from the ideal standard spectrum of gray levels may be tolerable in many circumstances. However, there are situations in which the variation between outputs from different marking devices presents a problem. For instance, a single print job may be produced in parts, with different parts being produced on different printers. In this case, it may be desirable to match the outputs of the different printers to each other or to an objective standard, thus ensuring consistency throughout the entire print job output.

Methods of calibrating a marking device exist to compensate for variation from the ideal standard spectrum of tone levels. Existing methods typically involve calibrating the tone transfer function of a marking device to match an ideal objective standard. The tone transfer function is the relationship between a tone level specified by the client application and the resulting halftone level, which is the percentage of pixels that are turned on in a halftone cell. This function can be adjusted to offset any variation from the ideal spectrum of output tone levels. In this way, the marking device can approximate an ideal one-to-one standard relationship between a client-requested tone level and the resulting output tone level.

Calibration of a marking device is typically performed using a densitometer. A densitometer is an instrument that measures the "density" of an output tone level. For instance, the density of a gray level output from a black and white printer is the percentage of area that is black. A higher percentage of black area results in a higher density and a darker overall gray level. Densitometers can be used to measure the density of various output tone levels and detect any variations from the ideal standard. Alternatively, sample output tone levels can be compared to templates containing standard patterns that are known to accurately match a set of ideal tone levels. In each of these cases, disparities between the output and the ideal spectrum of tone levels can be identified. Once these disparities are identified, appropriate adjustments can be made to the tone transfer function to calibrate the marking device to the ideal standard. These methods are known in the art.

Known calibration methods, however, require some objective measure of the ideal spectrum of tone levels. For instance, special equipment such as a densitometer may be required to determine the true density of a sample output tone level. Moreover, a skilled operator usually is desired to accurately assess the results obtained from the densitometer. Yet a densitometer and a skilled operator are not always available. Alternatively, a template with accurate standard patterns is required to provide some objective measure of the ideal tone spectrum. However, a standard pattern also may not be available. Indeed, in many circumstances, it is simply not practical to match the output of a marking device to the ideal standard spectrum.

When it is desirable to produce consistent output among two or more marking devices, however, it may not be necessary to achieve the objective ideal standard with each of the devices. For instance, it would often be sufficient to match the output of a first printer with the output of a second printer, regardless of whether the two outputs match the ideal standard. It is, therefore, an object of the invention to provide improved methods and systems for matching the outputs of two or more marking devices without the need to reference an objective tone level standard. It is also an object of the invention to provide improved methods and systems for matching the outputs of two or more marking devices without the use of additional equipment, operators, or standard patterns required to achieve an objective standard tone spectrum.

BRIEF SUMMARY OF THE PREFERRED EMBODIMENTS

In accordance with the present invention, a method and system are described for substantially matching the output of one marking device with the output of another marking device.

According to one aspect of the invention, there is provided a method of substantially matching a first output produced by a first marking device with a second output produced by a second marking device. The method includes producing a first set of sample halftones using the first marking engine. A second set of sample halftones is produced using the second marking engine. The first and second sets of sample halftones are then compared and one or more calibration set points are determined. A tone transfer function is then adjusted in accordance with the calibration set points to create a modified tone transfer function. Finally, the modified tone transfer function is used to produce the first output from the first marking device.

According to another aspect of the invention, there is provided a marking system capable of substantially matching a first output produced by a first marking device with a second output produced by a second marking device. The system includes an optical sensor, an image processing subsystem, and a marking engine associated with the first marking device. The optical sensor is configured to determine one or more calibration set points by comparing a first set of sample halftones produced by the first marking device with a second set of sample halftones produced by the second marking device. The image processing subsystem is configured to receive an image from a client application, generate a custom tone transfer function in accordance with the calibration set points, and process the image using the modified tone transfer function to create a rasterized pixel stream. The marking engine is configured to receive the rasterized pixel stream and to produce the first output.

According to yet another aspect of the invention, a first marking device is provided. This first marking device is capable of producing a first output that is substantially matched to a second output produced by a second marking device. The first marking device includes a marking engine, a raster image processor, and a user interface. The user interface is configured to receive one or more calibration set points determined by comparing a first sample output produced by the first marking device with a second sample output produced by the second marking device, and to communicate the set points to the raster image processor. The raster image processor is configured to receive an input image from a client, to generate a custom tone transfer function in accordance with the calibration set points, and to process the image using the modified tone transfer function to create a matched rasterized pixel stream. The marking engine is configured to receive the matched rasterized pixel stream and to produce the first substantially matched output.

According to a still further aspect of the invention, a raster image processor is provided. The raster image processor includes a page description language interpreter and a raster memory device. A microprocessor is in communication with both the page description language interpreter and the raster memory device. The page description language interpreter is configured to receive a page description language image and to convert the page description language image to an intermediate image. The microprocessor is programmed to receive one or more calibration set points determined by comparing a first set of one or more sample halftones produced by a first marking device with a second set of sample halftones produced by a second marking device, to generate a custom tone transfer function using the calibration set points; and to apply the tone transfer function to the intermediate image to create a rasterized pixel stream. The raster memory device is configured to receive the rasterized pixel stream and to provide the rasterized pixel stream to a first marking device such that the first marking device produces a first output that is substantially matched with a second output produced by a second marking device.

According to an even further aspect of the invention, a system for matching a first output from a first printer with a second output from a second printer. The system includes means for comparing a first set of sample halftones produced by the first marking device with a second set of halftones produced by the second marking device to determine one or more calibration set points. In addition, the system includes means for generating a custom tone transfer function in accordance with the calibration set points. An image processing subsystem is configured to receive an image from a client application and to process the image using the modified tone transfer function to create a rasterized pixel stream. A marking engine associated with the first marking device is configured to receive the rasterized pixel stream and to produce the first output.

According to an additional aspect of the invention, a raster image processor is provided. The raster image processor includes means to receive one or more calibration set points, which are determined by comparing the first output with the second output. The raster image processor also includes means for generating a custom tone transfer function associated with the first marking device in accordance with the calibration set points such that a first output produced by the first marking device substantially matches a second output produced by the second marking device.

The invention and its various advantages will become more apparent to those skilled in the art from the ensuing detailed description of preferred embodiments, reference being made to the accompanying drawings.

BRIEF DESCRIPTION OF THE DRAWINGS

The subsequent description of the preferred embodiments of the present invention refers to the attached drawings, wherein.

DETAILED DESCRIPTION OF THE PREFERRED EMBODIMENTS

Because electrophotographic marking devices such as printers are well known, the present description will be directed in particular to elements forming part of or cooperating more directly with the present invention. Apparatus not specifically shown or described herein are selectable from those known in the prior art.

Figure 1:
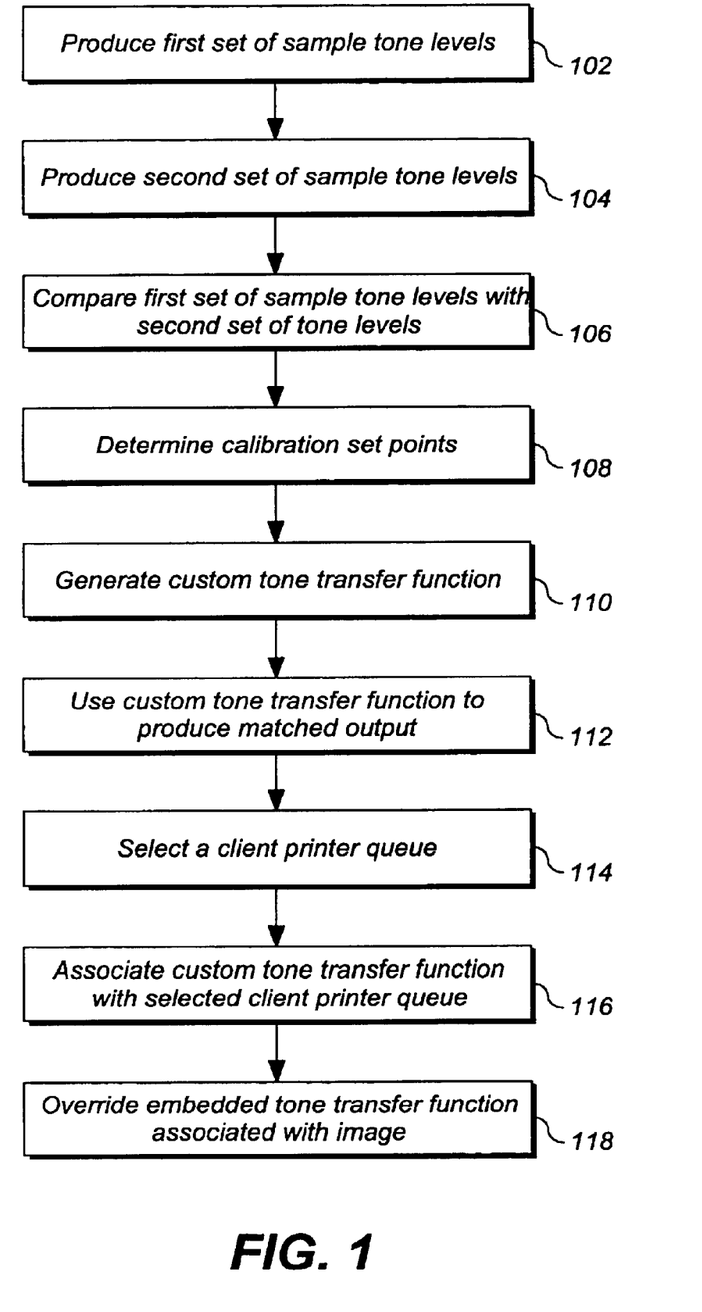
FIG. 1 shows a flow diagram depicting a method of matching the outputs of two marking devices according to one presently preferred embodiment of the invention.
Figure 2:
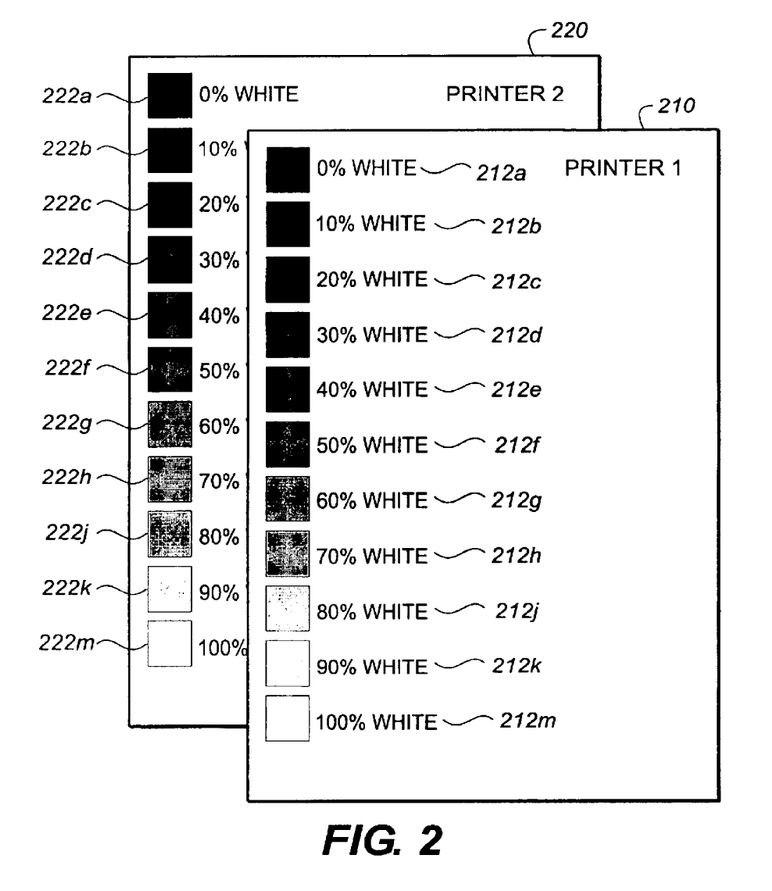
FIG. 2 shows an illustration of two sets of sample tone levels produced by two marking devices in accordance with the method shown in FIG. 1.

Referring now to the accompanying drawings, FIGS. 1 and 2 best illustrate a method of matching the output of a first marking device with the output of a second marking device according to one presently preferred embodiment of the invention. The first step 102 is to produce a set of sample tone levels from the first marking device. For instance, FIG. 2 shows a first sample output 210 from a first printer. The first sample output 210 includes a first set of sample tone levels 212a–m. By way of example, these tone levels 212a–m may be halftones. A second set of sample tone levels 222a–m is then produced from the second marking device in step 104. Again, the second set of tone levels 222a–m may be halftones. For ease of illustration, the first and second sets of tone levels 212a–m, 222a–m are shown in FIG. 2 in increments of 10% white. Preferable sets of sample tone levels would have a finer resolution. For instance, tone level increments of 2.5% white may be used.

In step 106, the first set of sample tone levels 212a–m is compared with the second set of sample tone levels 222a–m. The operator of the marking device may compare the sample tone levels 212a–m, 222a–m, either visually or using instrumentation, or the comparison may be automatically performed by, for instance, a scanner. One or more calibration set points are then determined in step 108. The calibration set points are determined by identifying a tone level 212 from the first set that most closely matches a tone level 222 from the second set. For instance, the 20% white tone level 212c on the first sample output 210 might match the 30% white tone level 222d on the second sample output 220. In this case, the density of the 20% white tone level 212c on the first sample output 210 most closely approximates the density of the 30% white tone level 222d on the second sample output 220. The relationship between these two sample tone levels 212c, 222d defines a calibration set point between the first printer and the second printer. This comparison process can be repeated for more of the sample tone levels in FIG. 2 to generate more calibration set points. Preferably, between ten and twenty calibration set points should be determined in step 108. However, more or less calibration set points may be used, depending upon the circumstances.

Once the calibration set points have been determined, a custom tone transfer function is generated in step 110. The custom tone transfer function represents the relationship between the first and second sets of sample tone levels 212a–m, 222a–m. Because the first and second sets of sample tone levels 212a–m, 222a–m reasonably represent typical outputs from the first and second printers, respectively, the custom tone transfer function also more generally defines a relationship between those two typical outputs. This relationship can be used to match the output of one printer to that of the other printer, ensuring consistent output tone levels from both printers. The step 110 of generating a custom tone transfer function may include modifying an existing tone transfer function in accordance with the calibration set points.

To match the output from the first printer with the output from the second printer, the custom tone transfer function is used to control the output from the first printer in step 112. For instance, the calibration set point described above indicates that a 30% white tone level from the second printer produces the same output tone density as a 20% white tone level from the first printer. The result is that in response to the same client request for a 30% white tone level, the first printer produces a tone density that is lighter than that produced by the second printer. Thus, controlling the first printer to produce a darker tone density in response to this request provides for consistent output tone levels between the two printers. In particular, the first printer should produce a 20% white tone level in response to a client request for a 30% white tone level. That way, the first and second printers both produce the same output tone density in response to a client request for a 30% white tone level. It may be that neither of the printers is producing a perfect 30% white tone level according the objective ideal standard, but the outputs of the two printers are at least matched to each other for this tone level. Applying this method to a variety of tone levels 212a–m, 222a–m may ensure consistent output across the entire spectrum of available marking device output.

If necessary, reverse halftoning may be employed to allow for tone level manipulation of images that are rasterized at the application level. In this case, there are no inherent and distinct halftones or tone levels included in the image. Reverse halftoning converts the raster image into a collection of halftone cells, each of which consists of a number of the pixels from the raster image. These tone level of each halftone cell then may be adjusted according to the custom tone transfer function. This process would be part of step 112, in which the custom tone transfer function is used to produce a matched output.

Optionally, the custom tone transfer function may be assigned to all print jobs associated with a certain print queue or virtual printer by selecting the particular print queue (step 114) and associating the custom tone transfer function with the selected print queue (step 116). It is also optional to override any default tone transfer functions that may be embedded in a PDL-encoded image (step 118).

Figure 3:
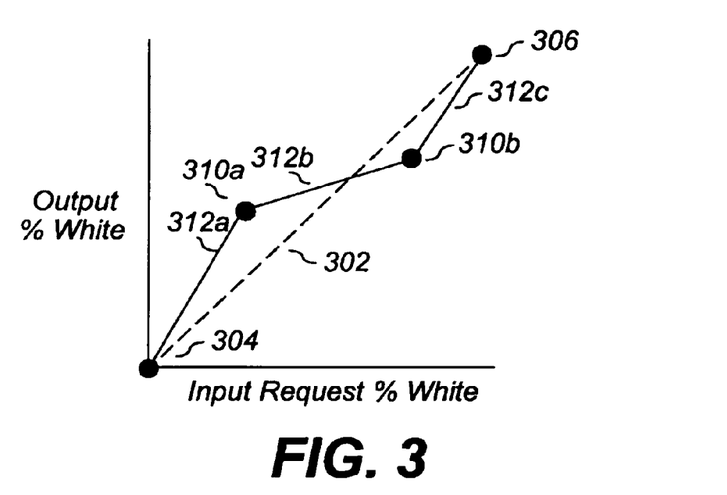
FIG. 3 shows a graph of a custom tone transfer function according to another presently preferred embodiment of the invention.

The generation of a custom tone transfer function (step 110) may be performed according to any of a number of different statistical methods. Given one or more calibration set points, a function should be defined that includes each of the set points. FIG. 3 shows a graph 300 of output percentage white produced versus input percentage white requested. Typically, marking devices use a unity tone transfer function 302 to map input to output. At one end 304 of the unity transfer function 302, a 0% white tone level request corresponds to a 0% tone level output. Likewise, at the other end 306, a 100% white tone level request corresponds to a 100% tone level output. In between these end points 304, 306, the unity transfer function produces a similar one-to-one correspondence for all input values. A custom tone transfer function differs in that it incorporates one or more calibration set points, such as set points 310a,b. For instance, the calibration set points 310a,b of FIG. 3 are linked using linear segments 312a–c. Alternatively, in FIG. 4, smooth curve segments 412a–c are used to link the calibration set points 310a,b. In either case, the end points 304, 306 preferably remain the same, mapping 0% white to 0% white, and 100% white to 100% white. This is generally preferable even when the actual 0% white outputs (i.e. 100% black) of the two printers do not match exactly. However, the endpoints of a custom tone transfer function may be adjusted if desired.

The method described above has generally been described with reference to the gray tone levels produced by a black and white printer. This method is equally applicable to systems that produce color output. In the case of a color printer that uses red, green, and blue (RGB) as its component colors, a separate custom tone transfer function should be generated for each of the three component colors. Similarly, in the case of a printer that uses cyan, yellow, magenta, and black as its component colors, a separate custom tone transfer function should be generated for each of those four component colors. In each of these cases, first and second sets of sample tone levels 212, 222 are produced for comparison of different shades of each component color. Additionally, the method can be applied to printers that produce accent colors and printers with any number of specialized supplemental color systems. Again, first and second sets of sample tone levels would be produced for each of the accent or supplemental colors.

A marking system 500 according to another presently preferred embodiment of the invention will now be discussed with reference to FIG. 5. The marking system 500 includes a computer front end or client 510 and a marking device 520. The client 510 includes a client application 512 that may be used to create or find an image to be produced by the marking device 520. Many client applications 512 are available, such as Photoshop® available from Adobe Systems Inc. of Mountain View, Calif. Typically, the process of producing an image begins with the selection of a "print" option in the client application 512. The client application 512 then sends the encoded image 516 to a client marking device driver 514. The client device driver 514 encodes the image in a PDL. Available PDLs include the PostScript® language, the portable document ("PDF") language, and the print control language ("PCL"). The client device driver 514 itself may be a general PostScript page description ("PPD") driver, or it may be a special driver customized for the client application 512 or for the operating system of the client 510. The client device driver 514 is in communication with the marking device 520. After encoding the image in a PDL, the client device driver 514 sends the encoded image 516 to the marking device 520.

The marking device 520 includes a raster image processor 522 and a marking engine 524. The raster image processor 522 receives the PDL-encoded image 516 from the client device driver 514. The raster image processor then interprets the PDL-encoded image 516 and converts the encoded image 516 into a rasterized pixel stream 526. The rasterized pixel stream 526 is then provided to the marking engine 524 for production onto a receiver.

Figure 6:
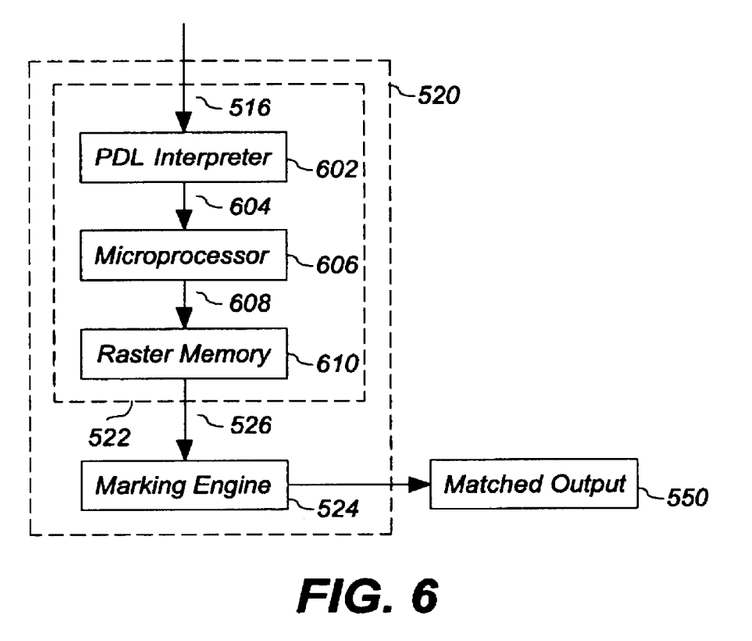
FIG. 6 shows a block diagram depicting a marking device according to another presently preferred embodiment of the invention.

FIG. 6 shows a raster image processor 522 in more detail according to another presently preferred embodiment of the invention. A PDL interpreter 602 receives and interprets the PDL-encoded image 516. The PDL interpreter may be, for example, a PostScript Interpreter available from Adobe Systems, Inc. The PDL interpreter 602 converts the PDL-encoded image to an intermediate image and passes the intermediate interpreted image 604 to a microprocessor 606. The microprocessor 606 applies a tone transfer function to the image 604. As described below, it is this tone transfer function that may be adjusted to match the output of the marking device 520 with the output of another marking device. The raster image 608 is then stored by a raster memory 610 and provided to the marking engine 524 in the form of a rasterized pixel stream 526.

Figure 5:
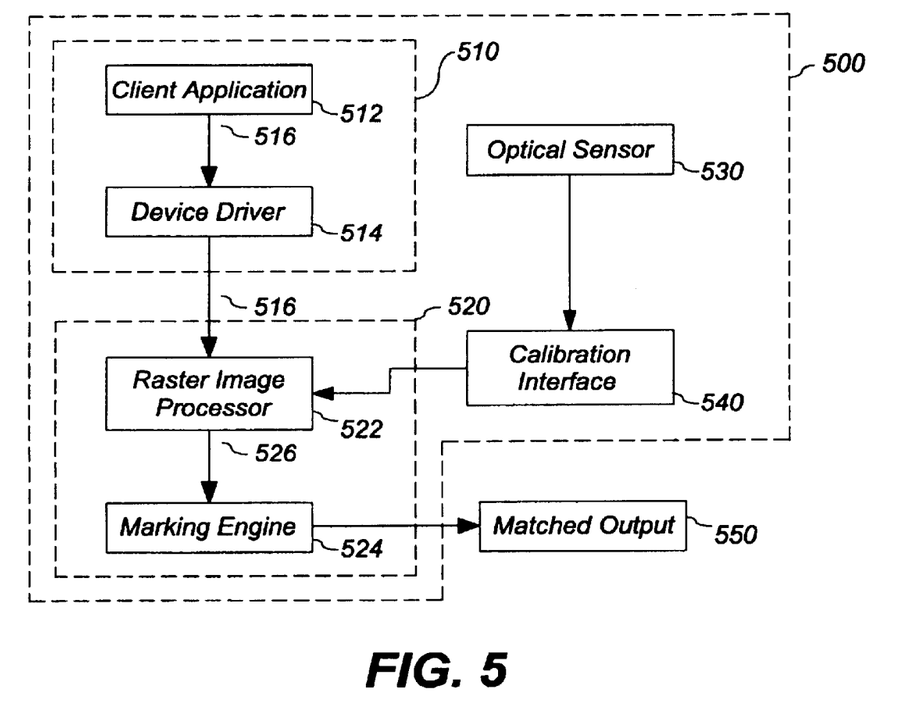
FIG. 5 shows a block diagram depicting a marking system according to another presently preferred embodiment of the invention.

In both FIGS. 5 and 6, the raster image processor 522 is shown as a component part of the marking device. Alternatively, the raster image processor 522 may reside at the client 510 or it may be a standalone unit separate and distinct from the marking device 520.

Also shown in FIG. 5 are an optical sensor 530 and a calibration interface 540. In accordance with the method described above, the optical sensor 530 compares the first and second sets 212, 222 of sample tone levels to determine one or more calibration set points 310. The optical sensor 530 may consist of a human operator that visually compares the first and second sets 212, 222 of tone levels to identify individual tone levels 212a–m, 222a–m that match. As described above, these pairs of matching tone levels 212a–m, 222a–m are then used to define calibration set points 310. If available, a densitometer also may be used as the optical sensor 530 to identify pairs of matching tone levels 212a–m, 222a–m. Alternatively, a scanner may be used as the optical sensor 530. The scanner may be a flatbed desktop scanner that is configured to scan the first and second output pages 210, 220 to identify calibration set points 310. The scanner may do this by identifying and comparing individual sample tone levels 212a–m, 222a–m that may, for instance, be arranged in pre-determined locations on the sample output pages 210, 220.

Once determined, the calibration set points 310 are received by the calibration interface 540. The calibration interface 540 may comprise a user interface that receives calibration set points 310 that have been determined visually by an operator or through use of a densitometer. In this case, the operator enters matching tone level percentages in response to user interface prompts. Alternatively, the calibration interface 540 may comprise an electronic connection with a scanner for automatically receiving calibration set points 310 determined by the scanner. When a scanner is used as the optical sensor, the user may place the sample output pages 210, 220 in a pre-determined relationship on the scanner before the process of automatic comparison begins. In any event, the calibration interface 540 may reside at the client 510, the marking device 520, or it may constitute a separate component.

Collectively, the calibration interface 540, the client device driver 514, and the raster image processor 522 may comprise an image processing subsystem. As a whole, the image processing subsystem receives an image from the client application 512, adjusts the tone transfer function in accordance with the calibration set points 310 to generate a custom tone transfer function, and processes the image using the custom tone transfer function to create a rasterized pixel stream 526. The rasterized pixel stream 526 is then used by the marking engine to produce an output that is matched to the output of the second marking device in accordance with the method described above.

In the presently preferred embodiment of FIG. 5, the calibration set points 310 are sent from the calibration interface 540 to the raster image processor, which generates a custom tone transfer function in accordance with the method described above. Alternatively, according to another presently preferred embodiment, the calibration set points 310 may be sent to the client 510, and the custom tone transfer function may be generated and applied at the client level, as opposed to the marking-device level. In any of these cases, the custom tone transfer function may take the form of a lookup table that maps a given output tone level 222a–m from the second printer to a matching output tone level 212a–m from the first printer. Appendix A includes software source code for a user interface program that operates as part of the marking device 520 and serves the function of the calibration interface 540. The program prompts a user for calibration set point information, generates a custom tone transfer function based on this information, and provides the custom tone transfer function to the raster image processor 522. The logical operation of a process similar to that embodied in the source code of Appendix A will now be discussed with reference to FIG. 7.

Figure 7:
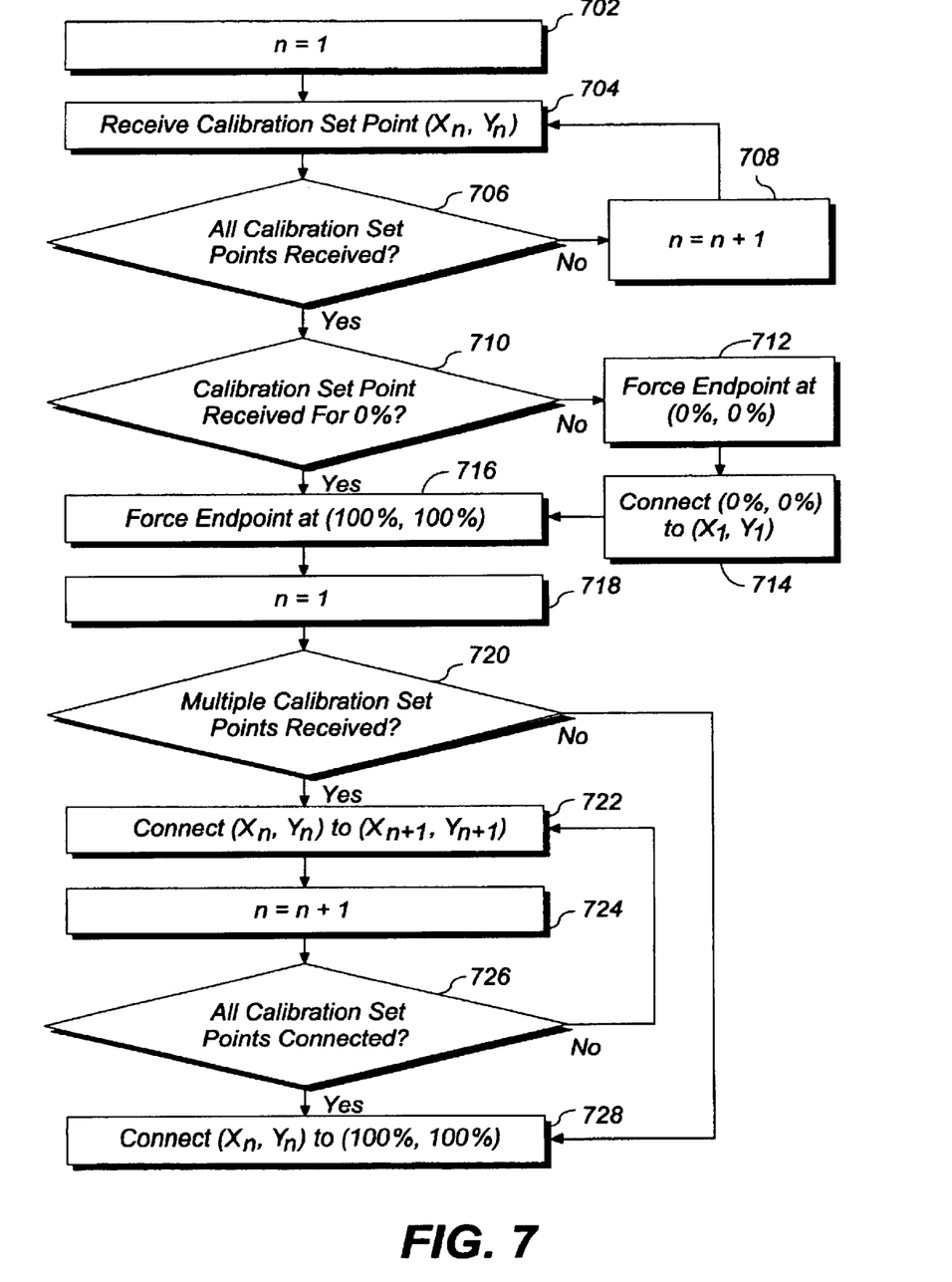
FIG. 7 shows a flow diagram illustrating a process of receiving calibration set points at a marking device and generating a custom tone transfer function according to another presently preferred embodiment of the invention.

FIG. 7 illustrates a flow diagram of logic similar to that embodied in the source code of Appendix A. The process begins by initializing a counter variable "n" and setting it equal to one in step 702. The program then receives a calibration set point in step 704. The calibration set point is received in the form of a matching percentage. The matching percentage reflects a match point between a sample tone level from the first sample output and a sample tone level from the second sample output. This information may be represented in the form of a Cartesian coordinate set, $(X_n, Y_n)$, where $X_n$ represents the percentage white of the first matching sample tone level, and $Y_n$ represents the percentage white of the second matching sample tone level.

The calibration set point is received from a marking device operator via a user interface. In this case, the user interface serves as the calibration interface 540 shown in FIG. 5. In step 706, the program determines whether all calibration set points have been received. This may be accomplished by receiving an instruction from the marking device operator that all set points have been entered. If all set points have not been entered, the counter is incremented in step 708 and then another calibration set point is received in step 704. Multiple calibration set points preferably are received in increasing order of percentage whiteness. Once all of the calibration set points have been received, the program advances to step 710, in which the process of generating a custom tone transfer function in accordance with the calibration set points begins.

In step 710, the program determines whether a calibration set point was received that corresponds to 0% white. If so, the program skips to step 716. If no 0% white calibration set point is received, however, the program proceeds to step 712, in which an endpoint of the custom tone transfer function is forced to the point (0%, 0%) to reflect an all-black tone level. This endpoint, (0%, 0%), is then connected to the first calibration set point (X1, Y1) in step 714. In step 716, the other endpoint of the custom tone transfer function is forced to the point (100%, 100%) to reflect an all-white tone level. Next, in step 718, the counter variable is again set equal to one. In step 720, the program determines whether multiple calibration set points were received. If not, the program skips to step 728, which is described below. If it is determined in step 720 that multiple calibration set points were received, however, the program proceeds to step 722 in which the first set point $(X_n, Y_n)$ is connected to the second set point $(X_{n+1}, Y_{n+1})$. The counter variable n is then incremented in step 724. Next, in step 726, the program determines whether all calibration set points have been connected. If so, the program proceeds to step 728, in which the last connected calibration set point $(X_n, Y_n)$ is connected to the endpoint (100%, 100%) to complete the custom tone transfer function. Alternatively, if the program determines in step 726 that not all calibration set points have been connected, the program returns to step 722 and connects the second set point $(X_n, Y_n)$ to the third set point $(X_{n+1}, Y_{n+1})$. This loop repeats until the program determines in step 726 that all calibration set points have been connected. It should be noted that if the calibration set points were not received in increasing order of percentage whiteness in steps 704 through 708, the set points should first be sorted into this order before connecting them in steps 710 through 728.

Figure 4:
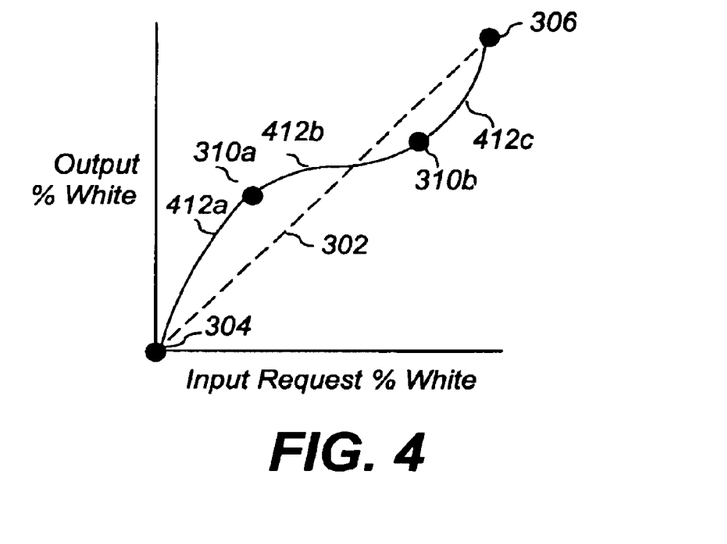
FIG. 4 shows a graph of a custom tone transfer function according to another presently preferred embodiment of the invention.

As described with reference to FIGS. 3 and 4, there are a number of different statistical techniques for connecting the calibration set points to one another. Any of these techniques may be used in connection with the process illustrated in FIG. 7 to achieve desired results.

A similar calibration interface may be used to receive calibration set points from a scanner attached to the client and to generate a custom tone transfer function based upon the set points received. A suitable calibration interface program is illustrated in the flow diagram of FIG. 8 and with reference to the illustration of FIG. 2. First, a counter variable "n°" is initialized and set equal to one in step 802. Next a sample tone level 212*a* is selected from the first sample output 210 in step 804. The scanner may identify and select the sample tone level 212*a*, for instance, based on its location at a prearranged position on the first sample output page 210. A variable, which may be referred to as White%1, is then set equal to the value of the percentage whiteness of the selected sample tone level 212*a* in step 806. Next, in step 808, a sample tone level 222*a* is selected from the second sample output 220. A second variable, which may be referred to as White%2, is then set equal to the value of the percentage whiteness of the selected sample tone level 222*a* in step 810. Then, in step 812, the program determines whether White%1 is a close match for, or is approximately equal to, White%2. If there is a match, the program skips to step 818, described below. If, however, there is no match, the program proceeds to step 814, in which the next sample tone level 222*b* is selected from the second sample output 220. The program then determines whether the selected sample tone level 222*b* is the last on the second sample output 220. If so, the program proceeds to step 818. If not, the program returns to steps 810 and 812 to determine whether this newly selected sample tone level 222*b* from the second sample output 220 matches the selected sample tone level 212*a* from the first sample output 210.

Figure 8:
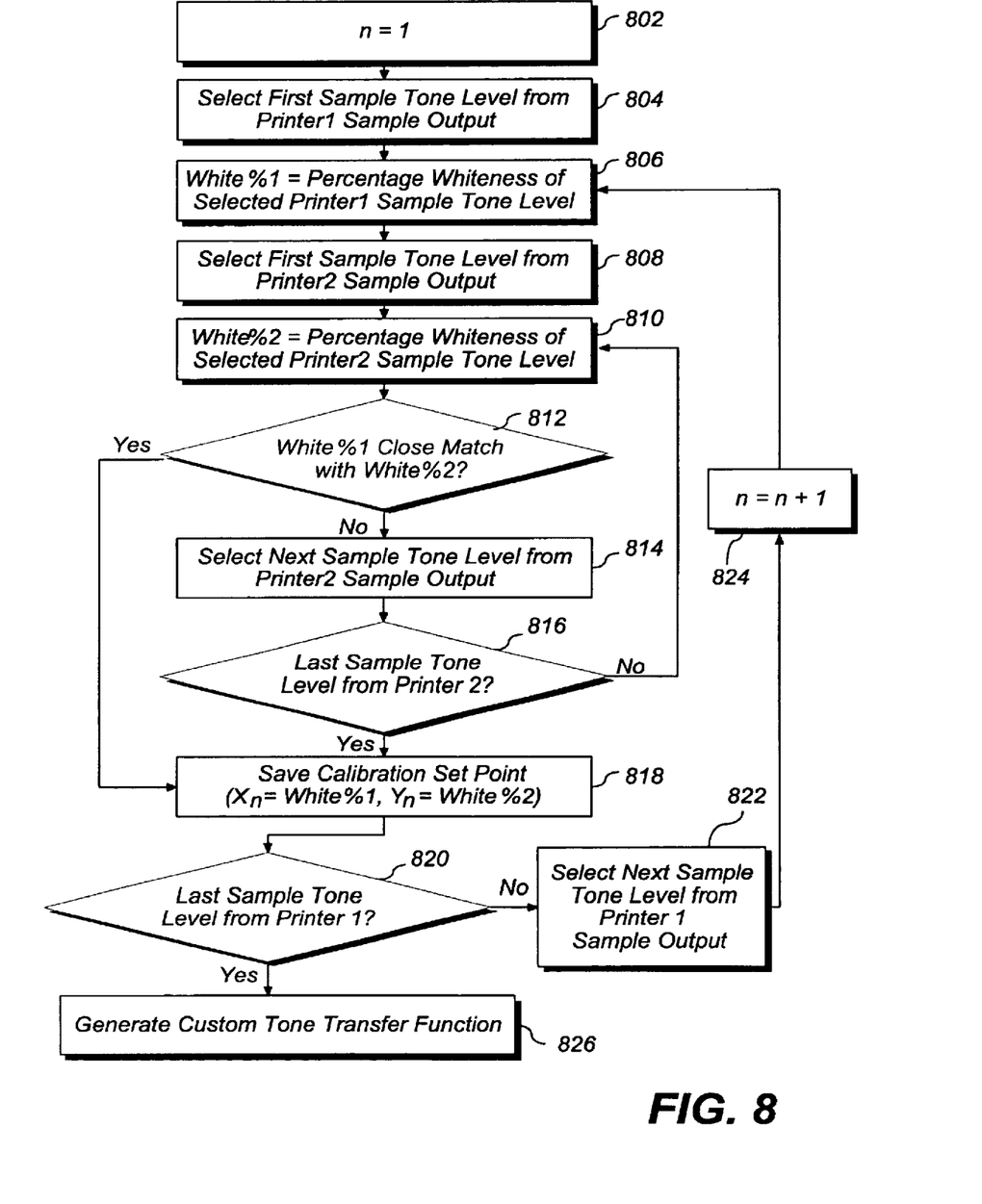
FIG. 8 shows a flow diagram illustrating a process for receiving calibration set points from a scanner and generating a custom tone transfer function according to another presently preferred embodiment of the invention.

In step 818, the program saves a calibration set point for the values $(X_n=\text{White}\%1, Y_n=\text{White}\%2)$. This occurs whenever a match is determined in step 812 or the last sample tone level 222*m* from the second sample output 220 has been compared with a given sample tone level 212*a* from the first sample output 210. Once a calibration set point has been saved in step 818, the program determines whether the selected sample tone level 212*a* is the last sample tone level on the first sample output 210. If so, the program skips to step 826. If not, the program proceeds to step 822 to select the next sample tone level 212*b* from the first sample output 210 in step 820. The counter n is then incremented in step 824, and the program returns to step 806 to begin the process of determining a calibration set point for the newly selected sample tone level 212*b*. In step 826, which commences once all of the calibration set points have been saved, the program generates a custom tone transfer function in accordance with the saved calibration set points. This may be accomplished according to the methods described above.

The invention has been described in detail with particular reference to preferred embodiments thereof and illustrative examples, but it will be understood that variations and modifications can be effected within the spirit and scope of the invention.

What is claimed is:

1. A method of substantially matching a first output produced by a first marking device with a second output produced by a second marking device, the method comprising the steps of:
   producing a first set of one or more sample tone levels using the first marking device;
   producing a second set of one or more sample tone levels using the second marking device;
   comparing the first set of sample tone levels with the second set of sample tone levels;
   determining one or more calibration set points;
   generating a custom tone transfer function associated with the first marking device in accordance with the calibration set points;
   using the custom tone transfer function to produce the first output from the first marking device
   wherein:
   the step of using the custom tone transfer function to produce the first output from the first printer further comprises the steps of:

reverse halftoning a raster image to divide the raster image into halftone cells; and using the custom tone transfer function to adjust one or more halftone levels associated with the halftone cells.

2. A method of substantially matching a first output produced by a first marking device with a second output produced by a second marking device, the method comprising the steps of:

producing a first set of one or more sample tone levels using the first marking device;

producing a second set of one or more sample tone levels using the second marking device;

comparing the first set of sample tone levels with the second set of sample tone levels;

determining one or more calibration set points;

generating a custom tone transfer function associated with the first marking device in accordance with the calibration set points;

using the custom tone transfer function to produce the first output from the first marking device; and, overriding an embedded tone transfer function associated with a PDL-encoded image to be produced on the first marking device.

3. A marking system capable of substantially matching a first output produced by a first marking device with a second output produced by a second marking device, the system comprising:

an optical sensor;

an image processing subsystem; and a marking engine associated with the first marking device;

wherein the optical sensor is configured to determine one or more calibration set points by comparing a first set of one or more sample tone levels produced by the first marking device with a second set of one or more sample tone levels produced by the second marking device;

wherein the image processing subsystem is configured to:
receive an image from a client application;
generate a custom tone transfer function in accordance with the calibration set points; and
process the image using the custom tone transfer function to create a rasterized pixel stream; and wherein the marking engine is configured to receive the rasterized pixel stream and to produce the first output.

4. A marking system as in claim 3, wherein:

the image processing subsystem includes a client marking device driver; and the custom tone transfer function is generated by the client marking device driver.

5. A marking system as in claim 3, wherein:

the image processing subsystem includes a raster image processor;

the custom tone transfer function is generated by the raster image processor.

6. A first marking device capable of producing a first output that is substantially matched to a second output produced by a second marking device, the first marking device comprising:

a marking engine;

a raster image processor including a tone transfer function; and a calibration interface;

wherein the calibration interface is configured to receive one or more calibration set points determined by comparing a first sample output produced by the first marking device with a second sample output produced by the second marking device, and to communicate the set points to the raster image processor;

wherein the raster image processor is configured to receive an input image from a client, to generate a custom tone transfer function in accordance with the calibration set points, and to process the image using the modified tone transfer function to create a matched rasterized pixel stream; and the marking engine is configured to receive the matched rasterized pixel stream and to produce the first substantially matched output.

7. A first marking device as in claim 6, wherein:

the tone transfer curve is implemented via a lookup table.

8. A raster image processor comprising:

a page description language interpreter, a raster memory device; and a microprocessor in communication with the page description language interpreter and the raster memory device; and wherein the page description language interpreter is configured to receive a page description language image and to convert the page description language image to an intermediate image;

wherein the microprocessor is programmed to receive one or more calibration set points determined by comparing a first set of one or more sample tone levels produced by a first marking device with a second set of sample tone levels produced by a second marking device, to generate a custom tone transfer function using the calibration set points; and to apply the tone transfer function to the intermediate image to create a rasterized pixel stream;

and wherein the raster memory device is configured to receive the rasterized pixel stream and to provide the rasterized pixel stream to a first marking device such that the first marking device produces a first output that is substantially matched with a second output produced by a second marking device.

9. A system for matching a first output from a first printer with a second output from a second printer comprising:

means for comparing a first set of one or more sample tone levels produced by the first marking device with a second set of one or more sample tone levels produced by the second marking device to determine one or more calibration set points;

means for generating a custom tone transfer function in accordance with the calibration set points to generate a modified tone transfer function;

an image processing subsystem configured to receive an image from a client application and to process the image using the modified tone transfer function to create a rasterized pixel stream;

a marking engine associated with the first marking device, wherein the marking engine is configured to receive the rasterized pixel stream and to produce the first output.

* * * * *